(12) United States Patent
Ma et al.

(10) Patent No.: US 11,259,013 B2
(45) Date of Patent: Feb. 22, 2022

(54) CAMERA INSTALLATION ASSISTANCE DEVICE AND METHOD, AND INSTALLATION ANGLE CALCULATION METHOD, AND PROGRAM AND RECORDING MEDIUM

(71) Applicant: Mitsubishi Electric Corporation, Tokyo (JP)

(72) Inventors: Shaoxiang Ma, Tokyo (JP); Masahide Koike, Tokyo (JP); Junji Sukeno, Tokyo (JP); Susumu Iino, Tokyo (JP); Satoshi Michihata, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 17/265,204

(22) PCT Filed: Sep. 10, 2018

(86) PCT No.: PCT/JP2018/033465
§ 371 (c)(1),
(2) Date: Feb. 2, 2021

(87) PCT Pub. No.: WO2020/053936
PCT Pub. Date: Mar. 19, 2020

(65) Prior Publication Data
US 2021/0306621 A1 Sep. 30, 2021

(51) Int. Cl.
*H04N 17/00* (2006.01)
*H04N 7/18* (2006.01)
(Continued)

(52) U.S. Cl.
CPC .............. *H04N 17/002* (2013.01); *G06T 7/73* (2017.01); *G06T 7/80* (2017.01); *H04N 7/18* (2013.01); *G06T 2207/30204* (2013.01)

(58) Field of Classification Search
CPC .......... H04N 17/002; H04N 7/18; G06T 7/73; G06T 7/80; G06T 2207/30204
See application file for complete search history.

(56) References Cited

U.S. PATENT DOCUMENTS 6,520,647 B2 * 2/2003 Raskar .................. G03B 21/00
348/E9.027
6,877,863 B2 * 4/2005 Wood ..................... G06T 5/006
353/122
(Continued)

FOREIGN PATENT DOCUMENTS

JP 2006-121290 A 5/2006
JP 2007-274564 A 10/2007
(Continued)

OTHER PUBLICATIONS

International Search Report and Written Opinion dated Nov. 13, 2018, received for PCT Application PCT/JP2018/033465, Filed on Sep. 10, 2018, 10 pages including English Translation.

*Primary Examiner* — Brian P Yenke
(74) *Attorney, Agent, or Firm* — Xsensus LLP

(57) ABSTRACT

In a state in which an optical axis of a camera is normal to a surface, a relative angle of a projector with respect to the camera is set such that a marker is formed at the intersection of the optical axis of the camera with the surface. In a state in which the relative angle is unchanged and an installation angle of the camera is changed, the marker formed on the surface is shot by means of the camera, and, based on a distance between the marker and the intersection in the image obtained by the shooting, the installation angle of the camera is calculated. Furthermore, an error of the calculated installation angle with respect to a target value is calculated and displayed. Calculation or adjustment of the installation
(Continued)

angle can be made even if the surface on which the marker is formed is relatively narrow.

11 Claims, 13 Drawing Sheets

(51) Int. Cl.
*G06T 7/80* (2017.01)
*G06T 7/73* (2017.01)

(56) References Cited

U.S. PATENT DOCUMENTS

| | | | | |
|---|---|---|---|---|
| 7,204,596 B2* | 4/2007 | Tamura | ................ | H04N 5/7416 |
| | | | | 345/647 |
| 7,452,084 B2* | 11/2008 | Mochizuki | ............. | G01B 11/26 |
| | | | | 348/745 |
| 7,648,246 B2* | 1/2010 | Miyasaka | ............ | H04N 9/3194 |
| | | | | 353/69 |
| 7,980,703 B2* | 7/2011 | Yamamoto | ............. | G03B 21/53 |
| | | | | 353/70 |
| 8,836,869 B2* | 9/2014 | Suzuki | ................ | H04N 9/3197 |
| | | | | 348/744 |
| 8,866,976 B1* | 10/2014 | Ozawa | ................ | H04N 9/3185 |
| | | | | 348/745 |
| 11,108,992 B2* | 8/2021 | Tsunashima | ............ | G06T 7/579 |
| 2008/0181488 A1* | 7/2008 | Ishii | .......................... | B60R 1/00 |
| | | | | 382/154 |
| 2009/0322878 A1* | 12/2009 | Ishii | ...................... | G06T 3/0012 |
| | | | | 348/148 |
| 2011/0018973 A1 | 1/2011 | Takayama | | |
| 2012/0154643 A1* | 6/2012 | Okuyama | .......... | H04N 5/23238 |
| | | | | 348/241 |
| 2013/0050590 A1* | 2/2013 | Nobutani | ............. | H04N 9/3194 |
| | | | | 348/742 |
| 2013/0135463 A1 | 5/2013 | Aratani et al. | | |
| 2013/0335451 A1* | 12/2013 | Tsuji | ...................... | G06T 5/006 |
| | | | | 345/647 |
| 2018/0359466 A1* | 12/2018 | Sugiura | ................ | H04N 9/3194 |

FOREIGN PATENT DOCUMENTS

| | | |
|---|---|---|
| JP | 2013-113805 A | 6/2013 |
| JP | 2013-147114 A | 8/2013 |
| WO | 2009/119229 A1 | 10/2009 |

* cited by examiner

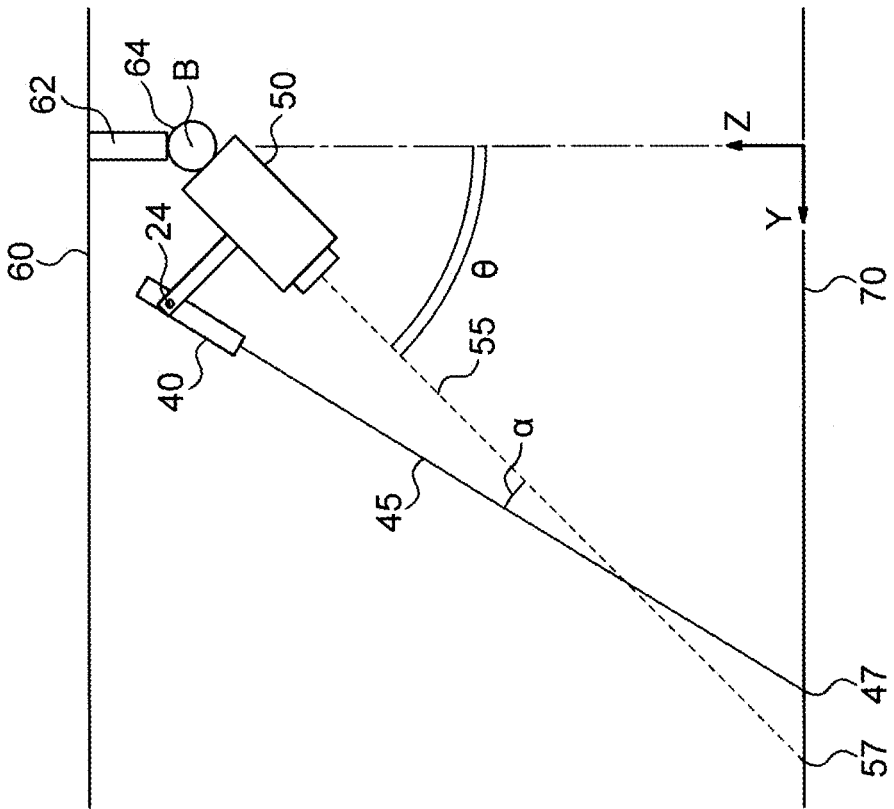
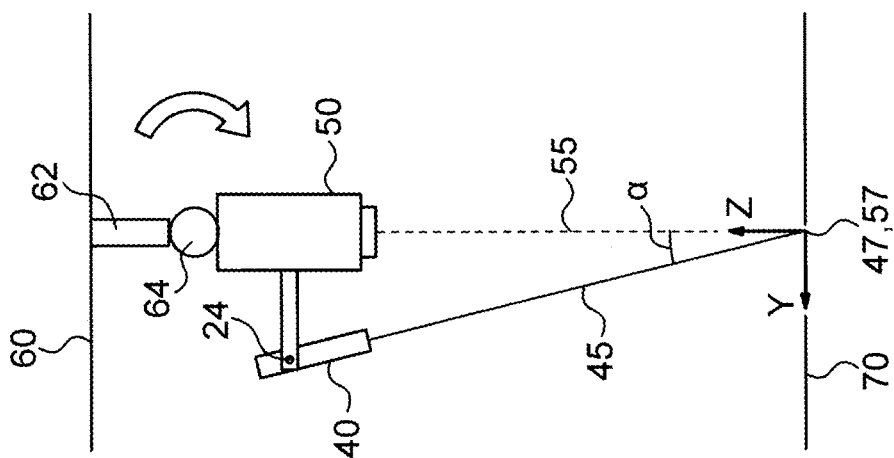

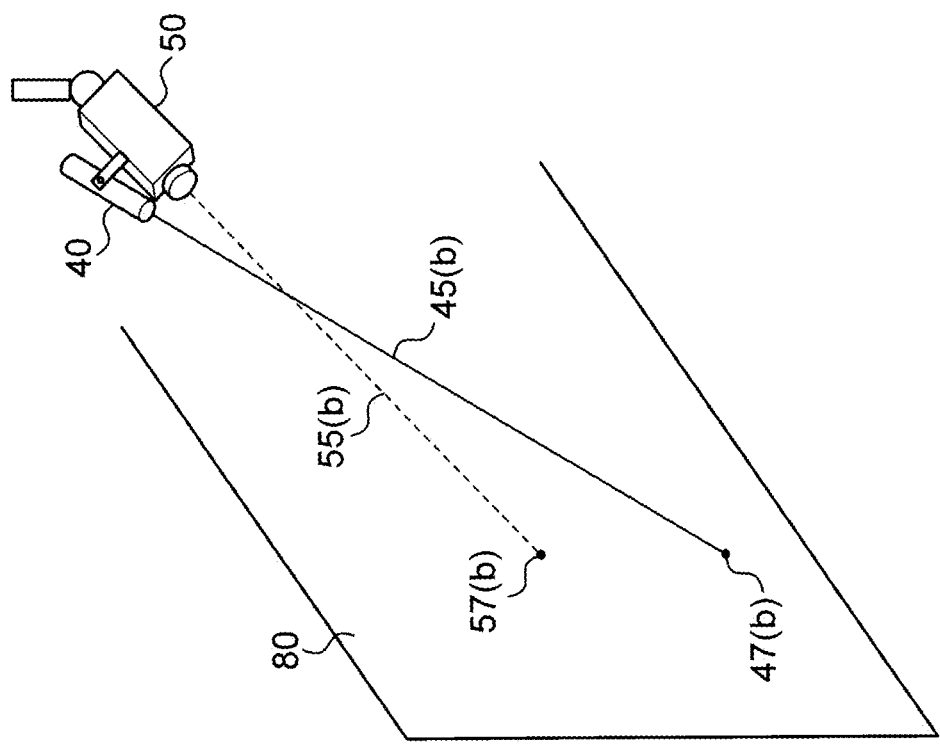
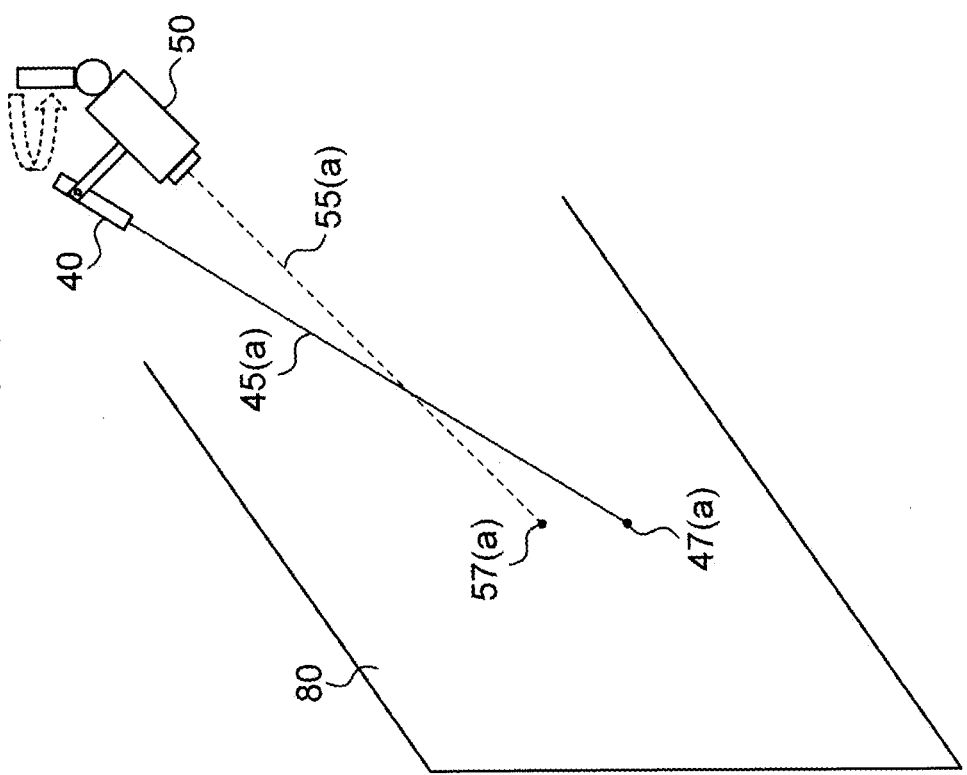

CAMERA INSTALLATION ASSISTANCE DEVICE AND METHOD, AND INSTALLATION ANGLE CALCULATION METHOD, AND PROGRAM AND RECORDING MEDIUM

CROSS-REFERENCE TO RELATED APPLICATION

The present application is based on PCT filing PCT/JP2018/033465, filed Sep. 10, 2018, the entire contents of which are incorporated herein by reference.

TECHNICAL FIELD

The present invention relates to a camera installation assistance device and method, and an installation angle calculation method. The present invention also relates to a program and a recording medium.

BACKGROUND ART

When a monitoring camera is installed, an installation angle needs to be made equal to a desired value (target value). The target value is so set that the area to be monitored is covered as efficiently as possible, and at the time of installation, adjustment is made such that the installation angle is equal to the target value.

Patent reference 1 discloses a calibration method by which the mounting angle (installation angle) of a vehicle-mounted camera for monitoring the surroundings of a vehicle is made equal to a desired value. In this method, a plurality of markers formed on the ground by illumination from a light emitting device are imaged by a camera, the markers in the captured image are recognized, the mounting angle is calculated based on the shapes of and the distances between the recognized markers, and the mounting angle is corrected based on the result of the calculation.

PRIOR ART REFERENCES

Patent References

Patent Reference 1: Japanese Patent Publication No. 2007-274564

SUMMARY OF THE INVENTION

Problems to be Solved by the Invention

The method described in Patent reference 1 has a problem that a light emitting device for forming the plurality of markers is necessary. Also, a plurality of markers need to be formed on the same surface, so that it is difficult to apply the method when, for example, there are many pieces of furniture, as in the interior of a building, and a wide surface is not available.

In view of the above described problems, an object of the present invention is to enable calculation or adjustment of an installation angle even when the surface available for the formation of a marker is relatively narrow.

Means for Solving the Problem

An installation assistance device according one aspect of the present invention <claim 1>.

An installation angle calculation method according another aspect of the present invention <claim 8>.

Effect of the Invention

According to the present invention, the installation angle can be calculated or adjusted even when the surface on which the marker is formed is relatively narrow.

BRIEF DESCRIPTION OF THE DRAWINGS

FIGS. 2(a) and 2(b) are schematic elevational views showing formation of a marker by means of a projector of the installation assistance device shown in FIG. 1, and shooting of the marker by the camera.

FIGS. 11(a) and 11(b) are perspective views showing the optical axis of the camera and the optical axis of the projector in the second embodiment of the present invention.

MODE FOR CARRYING OUT THE INVENTION

First Embodiment

Figure 1A:
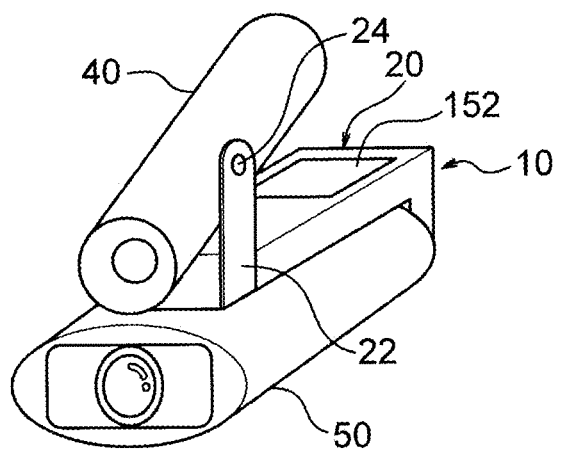
FIGS. 1(a) and 1(b) are perspective views showing an installation assistance device of a first embodiment of the present invention, together with a camera.
Figure 1B:
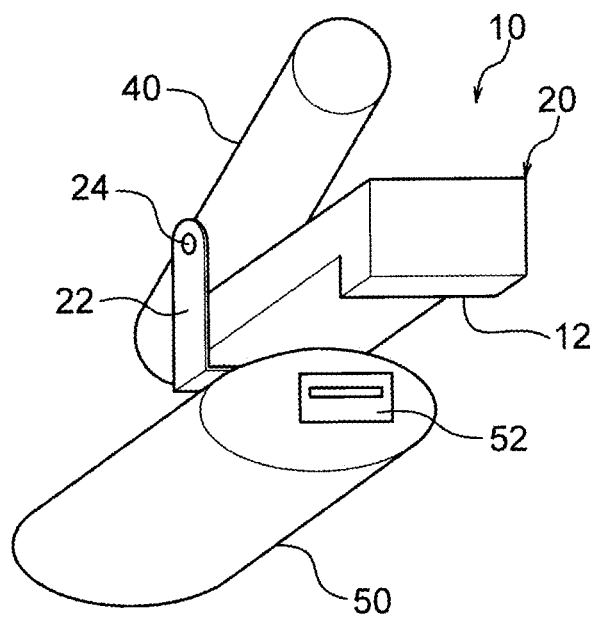

FIGS. 1(a) and 1(b) show an installation assistance device 10 according to a first embodiment of the present invention, together with a camera 50. FIG. 1(*a*) is a view as seen obliquely from the front, and FIG. 1(*b*) is a view as seen obliquely from the rear.

For example, the camera 50 is mounted to a ceiling 60, as shown in FIGS. 2(*a*) and 2(*b*). Specifically, the camera 50 is mounted by means of a mounting member 62 fixed to the ceiling 60 so as to shoot a floor surface 70. The mounting member 62 has a rotation support part 64, the camera 50 is supported by the rotation support part 64 and is rotatable about the rotation center B of the rotation support member 64, and a pan angle and a tilt angle can be adjusted by the rotation. The pan angle is an angle of rotation about a line normal to the floor surface 70. The tilt angle is an angle of inclination relative to a line normal to the floor surface 70.

FIG. 2(*a*) shows a state in which the optical axis 55 of the camera is normal to the floor surface 70, while FIG. 2(*b*) shows a state in which the optical axis 55 of the camera is inclined with respect to the floor surface 70. In FIG. 2(*b*), the tilt angle is indicated by a reference character $\theta$. In the state shown in FIG. 2(*a*), the tilt angle $\theta$ is zero.

The camera 50 is adjusted such that the pan angle is made equal to a desired value (target value) and, also, the tilt angle $\theta$ is made equal to a desired value (target value) $\theta r$. Either one of the adjustment of the pan angle and the adjustment of the tilt angle may be performed before the other.

It is assumed that a target value of the position (the position within the horizontal plane) at which the camera 50 is to be fixed to the ceiling 60, and the target values of the pan angle and the tilt angle of the camera 50 are set in advance.

As shown in FIGS. 1(*a*) and 1(*b*), the camera 50 has a female-type connector 52 and the installation assistance device 10 has a male-type connector 12.

By inserting the male-type connector 12 into the female-type connector 52, the installation assistance device 10 is fixed to the camera 50.

FIG. 1(*b*) shows a state in which the male-type connector 12 is not inserted in the female-type connector 52, while FIG. 1(*a*) shows a state in which the male-type connector 12 is inserted in the female-type connector 52.

The installation assistance device 10 has a main part 20 and a projector 40. The above-mentioned male-type connector 12 is provided in the main part 20.

The projector 40 is, for example, formed of a laser pointer, and projects a beam of light toward the floor surface 70, to form a marker (light spot) 47 on the floor surface 70.

In the following description, it is assumed that the marker 47 formed by the projector 40 is in the form of a dot, and the light beam projected from the projector 40 is in the form of a thin line.

The projector 40 is supported by a bearing part 22 such that it is rotatable relative to the main part 20, and rotates about a shaft 24 of the bearing part 22 when driven by a driving unit (driver) 160, which will be described later.

Because the projector 40 is rotatable relative to the main part 20, in a state in which the main part 20 is mounted to the camera 50, the projector 40 is rotatable relative to the camera 50, with the shaft 24 forming the center of the relative rotation.

By rotating the projector 40, the direction of the optical axis of the projector 40 can be changed. The projector's optical axis 45 is a trajectory followed by the center of the light beam projected from the projector 40.

The camera's optical axis 55 and the projector's optical axis 45 are in a same vertical plane. Here, the vertical plane means a plane normal to the floor surface 70.

A line passing through the camera's rotation center B and normal to the floor surface 70 is defined as a Z axis, and a line within the above-mentioned vertical plane and perpendicular to the Z axis is defined as a Y axis. The side of the Y axis toward which the projector 40 is positioned is defined as a positive side. With such definitions, the above-mentioned vertical plane is formed of a YZ plane.

The above-mentioned tilt angle $\theta$ is an angle of the optical axis 55 relative to the Z axis in the YZ plane.

The shaft 24 of the bearing part 22 extends in the direction perpendicular to the YZ plane.

The camera 50 captures the image of the intersection 57 of its optical axis 55 with the floor surface 70 and the area surrounding the intersection 57.

The position within the captured image corresponding to the camera's optical axis 55 (hence the intersection 57 of the optical axis 55 with the floor surface 70) is at a position indicated by reference characters OA in FIGS. 3(*a*) and 3(*b*). This position can be determined from the structure of the camera 50, specifically the positional relation between the optical axis 55 and an image forming plane, and hence is known.

As will be described later, a relative angle $\alpha$ is so adjusted that a marker MK in the captured image coincides with the intersection OA as shown in FIG. 3(*a*) when the camera's optical axis 55 is normal to the floor surface 70. The relative angle $\alpha$ is an angle formed by the projector's optical axis 45 and the camera's optical axis 55. In a state in which the above-mentioned adjustment has been made, the marker 47 is formed at a position of the intersection 57 as shown in FIG. 2(*a*).

After the adjustment of the relative angle $\alpha$, the tilt angle $\theta$ is adjusted. In the adjustment of the tilt angle $\theta$, the camera 50 is rotated about the rotation center B, while the relative angle $\alpha$ is maintained constant. This rotation is so performed that the intersection 57 of the camera's optical axis 55 with the floor surface 70 moves toward the side on which the projector 40 is positioned, i.e., toward the positive side of the Y axis.

At the time of installing the camera 50, the illustrated installation assistance device 10 is mounted to the camera 50, and is used for the adjustment of the tilt angle $\theta$, as well as the adjustment of the relative angle $\alpha$ performed prior to the adjustment of the tilt angle $\theta$.

In the following description, it is assumed that the installation assistance device 10 is removed from the camera 50 after the adjustment of the tilt angle of the camera 50. However, the installation assistance device 10 may be kept mounted to the camera 50 after the adjustment of the tilt angle of the camera 50.

Figure 4:
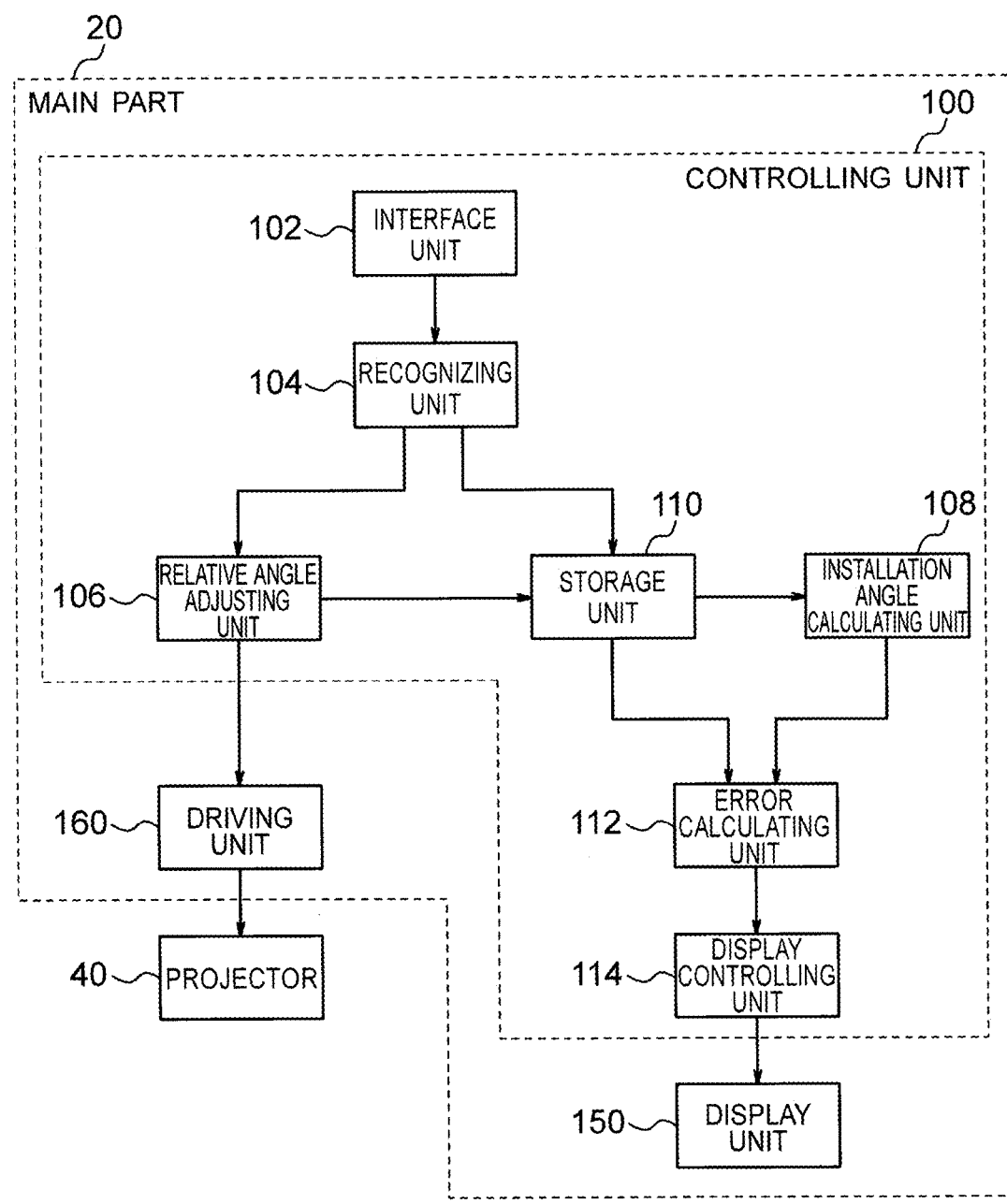
FIG. 4 is a functional block diagram showing the configuration of a main part of the installation assistance device shown in FIG. 1.

As shown in FIG. 4, the main part 20 of the installation assistance device 10 includes a controlling unit (controller) 100, a display unit 150, and the driving unit 160.

The controlling unit 100 includes an interface unit (interface) 102, a recognizing unit (recognizer) 104, a relative angle adjusting unit (relative angle adjuster) 106, an installation angle calculating unit (installation angle calculator) 108, a storage unit (storage) 110, an error calculating unit (error calculator) 112, and a display controlling unit (display controller) 114.

The interface unit 102 is connected to the camera 50, and acquires the image generated by shooting by means of the camera 50.

The recognizing unit 104 receives the image acquired by the interface unit 102, recognizes the marker MK in the captured image, and determines a deviation of the marker MK from the intersection OA in the captured image.

Based on the deviation of the marker MK in the captured image obtained when the camera's optical axis 55 is normal to the floor surface 70 (as in FIG. 2(a)), the relative angle adjusting unit 106 adjusts the relative angle α such that the deviation becomes zero. The adjustment is performed by causing the driving unit 160 to operate.

The storage unit 110 stores the relative angle α after the adjustment, as an "adjusted value".

From the position (the deviation) of the marker MK in the image obtained by shooting by means of the camera 50, when the relative angle α is at the adjusted value, and the camera's optical axis 55 is in a direction other than the direction normal to the floor surface 70, the installation angle calculating unit 108 calculates the tilt angle θ.

Here, the expression "the relative angle α is at the adjusted value" covers a situation in which the relative angle α is kept unchanged after being adjusted, and a situation in which the relative angle α is returned to the adjusted value after being changed to a different value after the adjustment.

The storage unit 110 also stores installation parameters generated by an installation parameter generating system, not illustrated.

The installation parameters include the target value of the installation position (the position within the horizontal plane), the target value of the pan angle, and the target value of the tilt angle by which the area to be monitored is covered most efficiently, and they are determined, for example, in advance by simulation or the like. Here, the expression "covered most efficiently" means that there are no blind spots, or the blind spots are minimized, or adverse effects of the blind spots from a viewpoint of image-capturing are at a minimum.

The error calculating unit 112 calculates an error by comparing the tilt angle θ calculated by the installation angle calculating unit 108 with the target value θr of the tilt angle stored in the storage unit 110.

The display controlling unit 114 causes the display unit 150 to display the error calculated by the error calculating unit 112.

The error may be displayed, for example, by characters, such as "+3 degrees", "−4 degrees", or the like. Alternatively, or additionally, the display may be one utilizing the size, the color or the like of a figure.

In FIG. 1(a), a display surface 152 of the display unit 150 is shown.

The operator can perform the work of adjusting the tilt angle (the change or correction of the installation angle by rotation of the camera 50 about the rotation center B), while observing the error displayed on the display surface 152.

Next, the adjustment of the relative angle by the relative angle adjusting unit 106, the calculation of the tilt angle by the installation angle calculating unit 108, and the calculation of the error by the error calculating unit 112 will be described with reference to FIG. 5 and FIG. 6.

Figure 5:
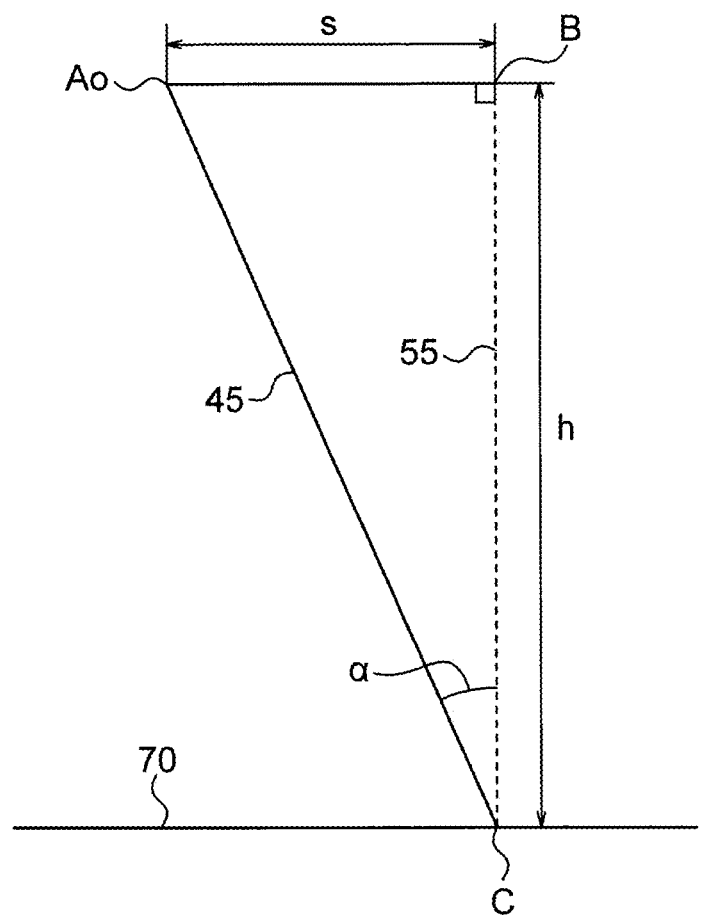
FIG. 5 is a view showing a state in which a relative angle has been so adjusted that the marker is formed at the intersection of the optical axis of the camera with a floor surface when the optical axis of the camera is normal to the floor surface.

FIG. 5 shows a state in which the camera's optical axis 55 is normal to the floor surface 70, and the relative angle α has been adjusted such that the marker is formed at the intersection of the camera's optical axis 55 with the floor surface 70.

Figure 6:
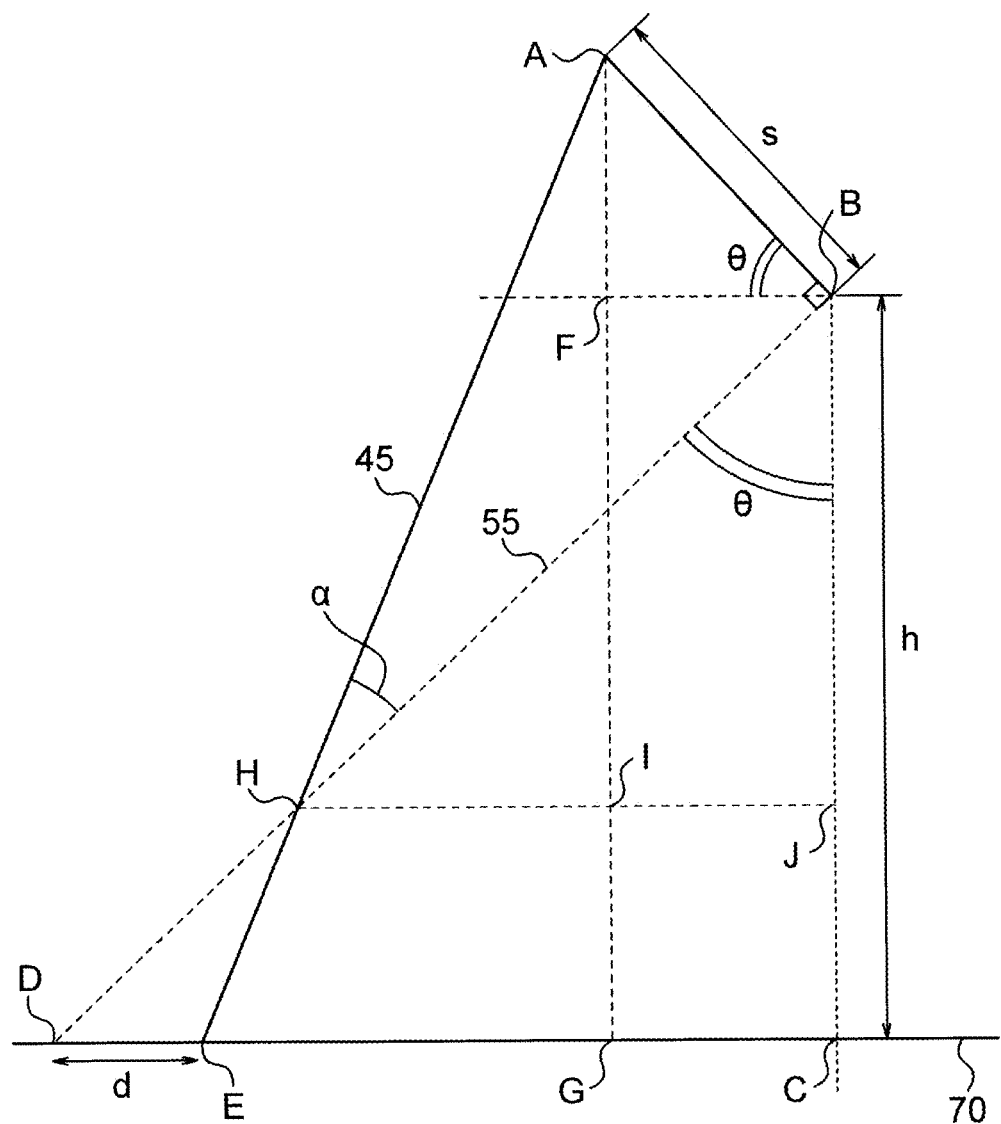
FIG. 6 is a view showing a deviation of the position of the marker formed when the optical axis of the camera is inclined with respect to the floor surface, from the intersection of the optical axis of the camera with the floor surface.

FIG. 6 shows a state in which the relative angle α is of the same value as in FIG. 5, and the camera is inclined.

Incidentally, it is assumed that the rotation center B is on the camera's optical axis 55, and the center 24 of the relative rotation within the YZ plane (the intersection of the center 24 of the relative rotation with the YZ plane) is on the projector's optical axis 45, and on a line (a line within the YZ plane) passing through the camera's rotation center B, and perpendicular to the camera's optical axis 55.

The position of the center (the shaft) 24 of the projector's relative rotation moves with the rotation of the camera.

The above-mentioned relative rotation center when the camera's optical axis 55 is normal to the floor surface 70 is denoted by Ao, as shown in FIG. 5, and the above-mentioned relative rotation center when the camera's optical axis 55 is inclined with respect to the floor surface 70 is denoted by A, as shown in FIG. 6, and the camera's rotation center is denoted by B.

Also, the intersection (57 in FIG. 2(a)) of the camera's optical axis 55 with the floor surface 70 when the camera's optical axis 55 is normal to the floor surface 70 is denoted by C, and the intersection (57 in FIG. 2(b)) of the camera's optical axis 55 with the floor surface 70 when the camera is inclined is denoted by D.

Furthermore, the intersection of the projector's optical axis 45 with the floor surface 70 (the position where the marker 47 is formed) when the camera is inclined is denoted by E, the intersection of a line passing through the relative rotation center A and normal to the floor surface 70, with a line passing through the rotation center B and parallel to the line DC is denoted by F, and the intersection of the line passing through the relative rotation center A and normal to the floor surface 70, with the floor surface 70 is denoted by G.

Furthermore, the intersection of the camera's optical axis 55 with the projector's optical axis 45 when the camera is inclined is denoted by H, the intersection of a line passing through the intersection H and parallel to the line DC, with the line AG is denoted by I, and the intersection of the line passing through the intersection H and parallel to the line DC, with the line BC is denoted by J.

Furthermore, the distance from the rotation center B to the above-mentioned intersection C is denoted by h, and the distance between the relative rotation center A and the rotation center B of the camera 50 is denoted by s.

The distance s is a value dependent on the structure of the camera 50 and the installation assistance device 10, and is known.

Figure 3A:
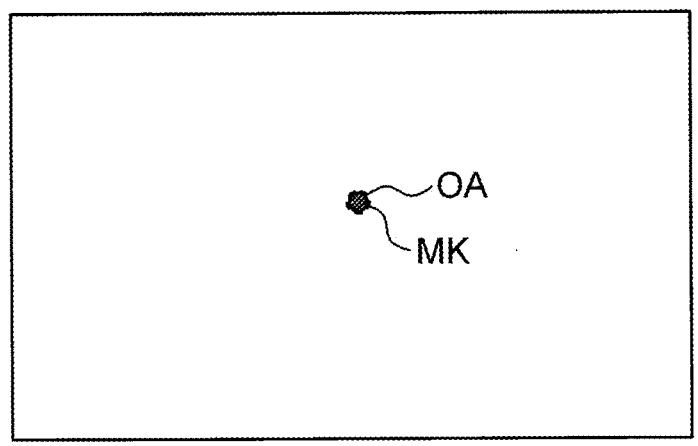
FIGS. 3(a) and 3(b) are views showing the position of the marker in the captured image.

The relative angle α is adjusted such that the marker MK in the captured image coincides with the intersection OA as shown in FIG. 3(a), when the camera 50 is not inclined, as described above, so that, in a state in which such adjustment has been made, the intersection of the projector's optical axis 45 with the floor surface 70 (the position where the marker is formed) coincides with the intersection C of the camera's optical axis 55 with the floor surface 70, as shown in FIG. 5.

Figure 3B:
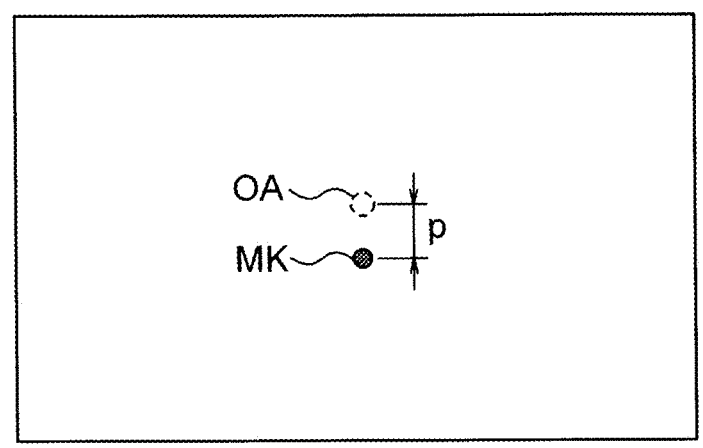

When the camera 50 is inclined, the intersection E of the projector's optical axis 45 with the floor surface 70 (the position where the marker is formed) deviates from the intersection D of the camera's optical axis 55 with the floor surface 70, as shown in FIG. 6, and, in the captured image, the marker MK appears at a position deviating from the intersection OA, as shown in FIG. 3(b).

The deviation (the distance DE) of the position E of the marker on the floor surface 70 is denoted by a reference character d, and the deviation of the marker MK in the captured image is denoted by a reference character p.

In FIG. 6, $\triangle AEG$ and $\triangle AHI$ are similar to each other, so that the following equation holds:

[Mathematical Expression 1]

$$\Delta E : \Delta H = \Delta G : \Delta I \quad (1)$$

Here,

[Mathematical Expression 2]

$$AH = \frac{h}{\cos\alpha} \quad (2a)$$

$$AG = h + s \cdot \sin\theta \quad (2b)$$

$$AI = h \cdot \cos\theta + s \cdot \sin\theta \quad (2c)$$

By substituting the equations (2a) to (2c) in the equation (1), the following equation (3) is obtained.

[Mathematical Expression 3]

$$AE: \frac{h}{\cos\alpha} = h + s \cdot \sin\theta : h \cdot \cos\theta + s \cdot \sin\theta \quad (3)$$

By transforming the equation (3), the following equation (4) is obtained.

[Mathematical Expression 4]

$$AE = \frac{h(h + s \cdot \sin\theta)}{\cos\alpha(h \cdot \cos\theta + s \cdot \sin\theta)} \quad (4)$$

Also, because $\Delta AGE$ is a right triangle, the following equation (5) holds.

[Mathematical Expression 5]

$$AE^2 = AG^2 - EG^2 \quad (5)$$

Here,
[Mathematical Expression 6]

$$EG = h \cdot \tan\theta - s \cdot \cos\theta - d \quad (6)$$

By substituting the equations (4), (2b), and (6) in the equation (5), the following equation (7) is obtained.

[Mathematical Expression 7]

$$\left\{ \frac{h(h + s \cdot \sin\theta)}{\cos\alpha(h \cdot \cos\theta + s \cdot \sin\theta)} \right\}^2 = (h + s \cdot \sin\theta)^2 + (h \cdot \tan\theta - s \cdot \cos\theta - d)^2 \quad (7)$$

The relative angle $\alpha$ can be determined from the angle (the rotation amount) by which the projector 40 is rotated. For example, the relative angle (the adjusted value) $\alpha$ may be determined by having a rotary encoder attached to the rotating part. Alternatively, if the driving unit 160 is formed of a pulse motor, the relative angle (the adjusted value) $\alpha$ may be determined from the number of pulses supplied to the pulse motor.

The distance h from the rotation center B of the camera 50 to the floor surface 70 can be calculated from $\alpha$ and s, by the following equation (8).

[Mathematical Expression 8]

$$h = \frac{s}{\tan\alpha} \quad (8)$$

Figure 7:
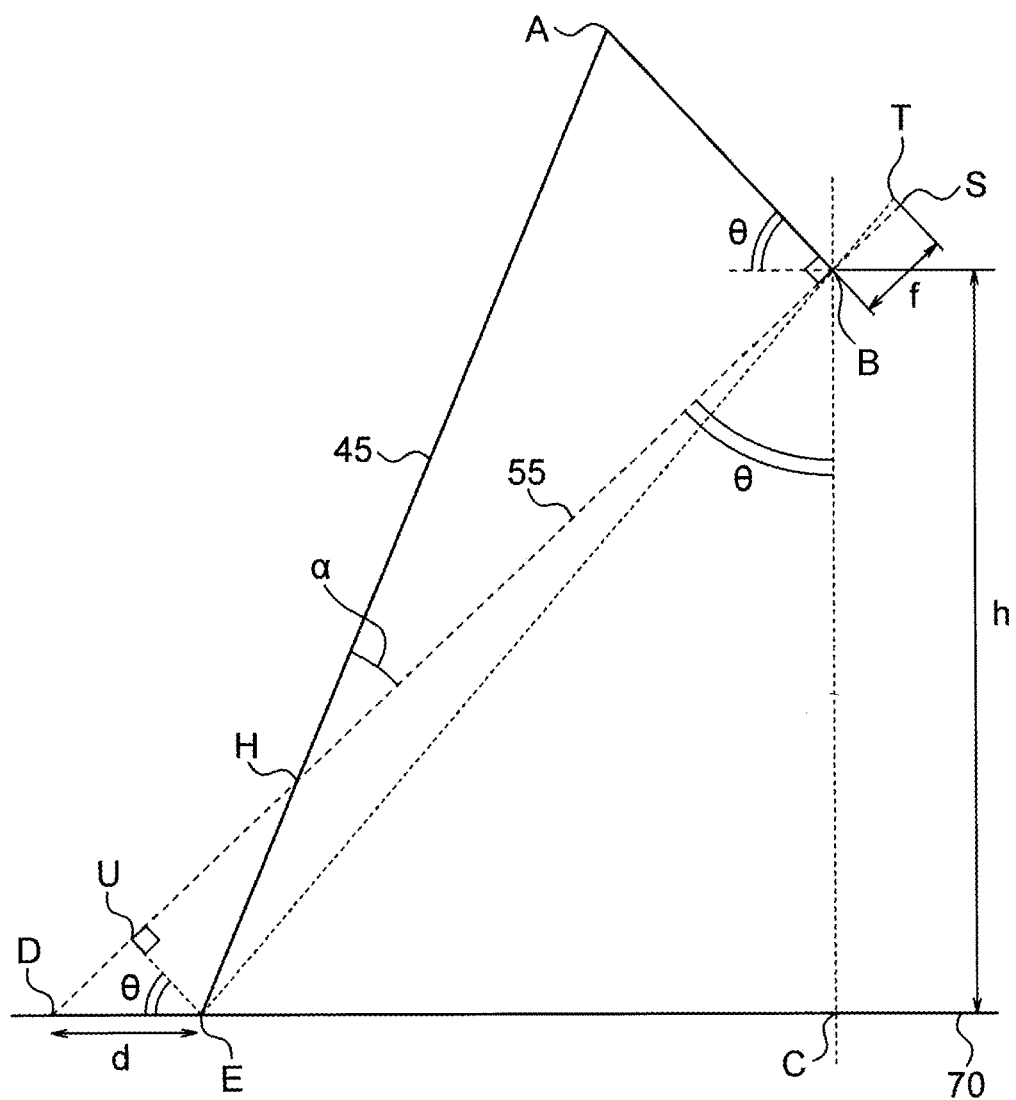
FIG. 7 is a view showing the relation between the deviation of the marker on the floor surface and a deviation of the marker in the captured image.

FIG. 7 shows the relation between the deviation d of the marker on the floor surface and the deviation p of the marker in the captured image.

In FIG. 7, it is assumed that the principal point of the lens of the camera 50 coincides with the rotation center B.

The intersection S of the optical axis 55 with the image forming plane of the camera 50 is at a position in the rear (the direction opposite to the subject) of the principal point B by a focal distance f.

The intersection of a line passing through the position E where the marker is formed and parallel to the line AB, with the optical axis 55 is denoted by U, and the intersection of a line passing through the intersection S and parallel to the line AB, with a line passing through the principal point B and the point E is denoted by T.

Furthermore, the length of the line ST is assumed to be p.

When shooting is made using the camera, an image is formed on the image forming plane at the back of the lens. When the marker is at a position E deviating by the distance d from the intersection D on the floor surface 70, the marker MK in the captured image appears at a position deviating by the distance p from the intersection OA.

Here, $\Delta BST$ and $\Delta BUE$ are similar to each other, so that the following equation holds:

[Mathematical Expression 9]

$$BU:BS = UE:ST \quad (9)$$

Here,

[Mathematical Expression 10]

$$BU = \frac{h}{\cos\theta} - d \cdot \sin\theta \quad (10a)$$

$$BS = f \quad (10b)$$

$$UE = d \cdot \cos\theta \quad (10c)$$

$$ST = p \quad (10d)$$

By substituting the equations (10a) to (10d) in the equation (9), the following equation (11) is obtained.

[Mathematical Expression 11]

$$\frac{h}{\cos\theta} - d \cdot \sin\theta : f = d \cdot \cos\theta : p \quad (11)$$

By transforming the equation (11), the following equation equation (12) is obtained.

[Mathematical Expression 12]

$$f \cdot d \cdot \cos\theta = p\left(\frac{h}{\cos\theta} - d \cdot \sin\theta\right) \quad (12)$$

By transforming the equation (12), the following equation (13) is obtained.

[Mathematical Expression 13]

-continued $$d(f \cdot \cos\theta + p \cdot \sin\theta) = \frac{p \cdot h}{\cos\theta} \quad (13)$$

By transforming the equation (13), the following equation (14) is obtained.

[Mathematical Expression 14]

$$d = \frac{p \cdot h}{(f \cdot \cos\theta + p \cdot \sin\theta)\cos\theta} \quad (14)$$

By substituting the equation (14) in the equation (7), the following equation (15) is obtained.

[Mathematical Expression 15]

$$\left\{\frac{h(h + s \cdot \sin\theta)}{\cos\alpha(h \cdot \cos\theta + s \cdot \sin\theta)}\right\}^2 = \quad (15)$$

$$(h + s \cdot \sin\theta)^2 + \left(h \cdot \tan\theta - s \cdot \cos\theta - \frac{p \cdot h}{(f \cdot \cos\theta + p \cdot \sin\theta)\cos\theta}\right)^2$$

Among the variables in the equation (15), s, α, h, p and f are known or can be calculated separately, as has been described, while θ is unknown.

By using the above-mentioned equation (15), the tilt angle θ can be determined from the distance p in the image.

The error calculating unit 112 determines a difference (an error) between the tilt angle θ calculated in the manner described above, and the target value θr stored in the storage unit 110.

The display controlling unit 114 causes the display unit 150 to display the error of the tilt angle having been calculated.

The operator changes the tilt angle responsive to the displayed error.

By repeating such a process and work, the tilt angle can be made close to or equal to the target value.

When a plurality of cameras are installed, the installation assistance device 10 is mounted to the plurality of cameras in turn, and the adjustment of the tilt angle is performed one camera at a time. That is, when adjustment for each camera is completed, the installation assistance device 10 is removed from the camera, and is mounted to the next camera, and a similar process is performed. With such a strategy, adjustment of the tilt angle for a plurality of cameras can be achieved using a single installation assistance device.

Figure 8:
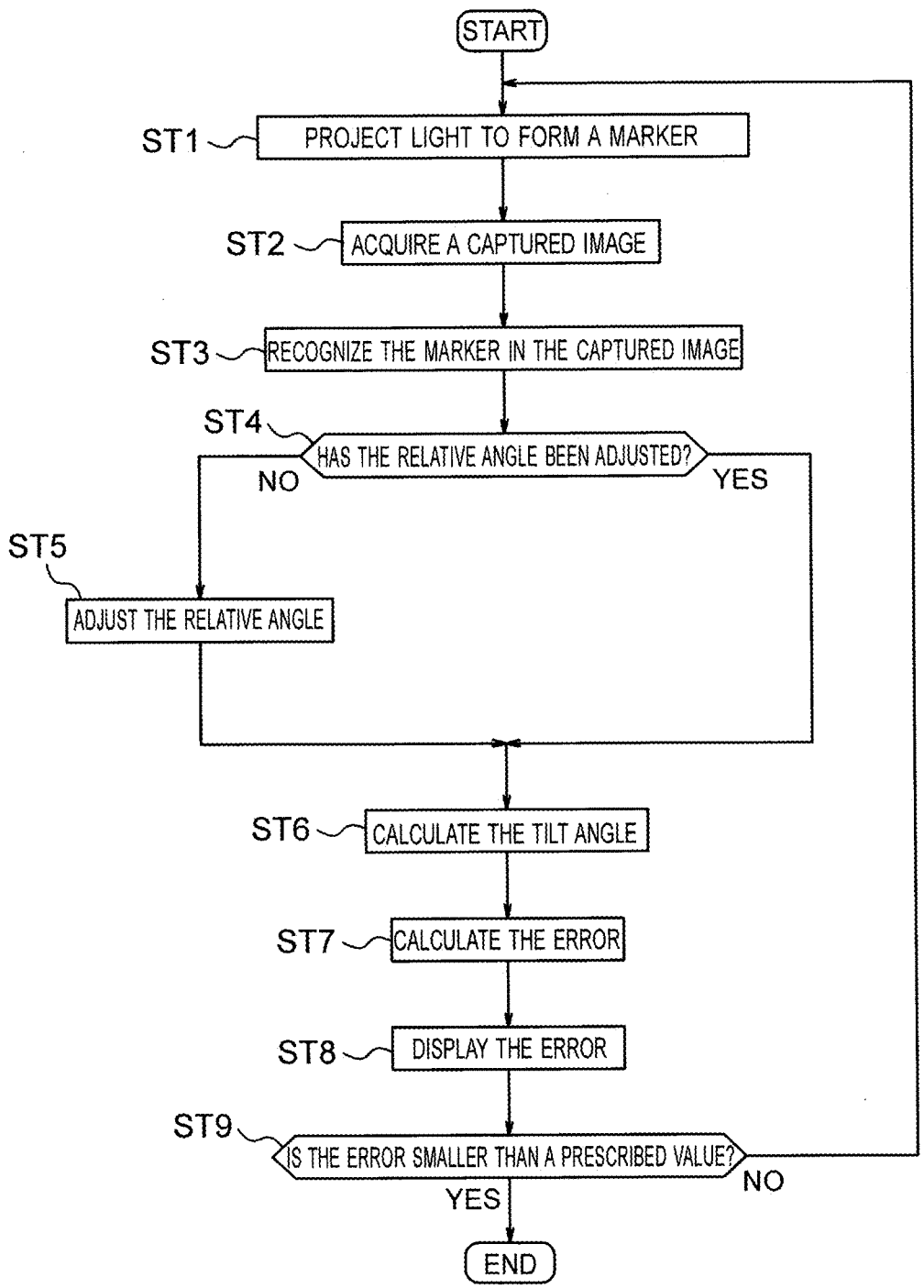
FIG. 8 is a flowchart showing the operation of the installation assistance device in the first embodiment.

FIG. 8 is a flowchart showing an example of a procedure of processes followed when the adjustment of the tilt angle is performed for one camera using the installation assistance device of the first embodiment.

First, in step ST1, the projector 40 is made to project a beam of light toward the floor surface 70. The projection of light is so made that a marker 47 is formed on the floor surface 70.

In step ST2, the interface unit 102 acquires a captured image from the camera 50, and supplies it to the recognizing unit 104.

In step ST3, the recognizing unit 104 recognizes the marker MK in the image, and transmits the image in which the marker has been recognized, to the relative angle adjusting unit 106 and the installation angle calculating unit 108.

Next, in step ST4, decision is made as to whether the adjustment of the relative angle α of the projector 40 with respect to the camera 50 has been completed.

If it has not been completed, the step performed next is step ST5. If it has been completed, the step performed next is step ST6.

In step ST5, the adjustment of the relative angle α is performed.

Specifically, the relative angle α is so adjusted that the marker 47 is formed at the intersection 57 of the camera's optical axis 55 with the floor surface 70, when the optical axis 55 of the camera 50 is normal to the floor surface 70, as shown in FIG. 2(*a*).

The adjustment of the relative angle α is performed by having the recognizing unit 104 recognize the marker MK in the captured image, having the relative angle adjusting unit 106 calculate the angular change amount necessary for the position of the recognized marker MK to become coincident with the position of the intersection OA, and having the driving unit 160 operate by the calculated angular change amount.

When the driving unit 160 is made to operate, the adjusted relative angle α is determined by accumulating the angle by which the projector 40 is driven to rotate, and stored in the storage unit 110.

After the process of step ST5, the operator starts the adjustment of the tilt angle θ of the camera 50.

The work for the adjustment is performed such that the tilt angle θ of the camera 50 becomes equal to the target value θr. Specifically, it is performed such that the error is eliminated or reduced while observing the error displayed by the display unit 150 by the processes described below.

In step ST6, the installation angle calculating unit 108 calculates the tilt angle (the measured value) θ of the camera 50, using the position (the deviation from the intersection OA) of the marker MK in the image, and supplies the result of the calculation to the error calculating unit 112.

In step ST7, the error calculating unit 112 calculates the error by comparing the tilt angle θ calculated by the installation angle calculating unit 108 with the target value θr of the tilt angle stored in the storage unit 110, and transmits the calculated error to the display controlling unit 114.

Next, in step ST8, the display controlling unit 114 causes the display unit 150 to display the error received from the error calculating unit 112.

Examples of the display are "+3 degrees" and "−4 degrees".

Responsive to the displayed error, the operator changes the installation angle of the camera 50.

For example, if the error is "+3 degrees", it is moved in the direction to reduce the installation angle (to change the installation angle in the negative direction).

In step ST9, the error calculating unit 112 decides whether the calculated error is smaller than a prescribed value.

If, in step ST9, the error is smaller than the prescribed value, the process is terminated.

If the error is not smaller than the prescribed value, the procedure returns to step ST1, and steps ST1 to ST9 are repeated.

As long as the error is not smaller than the prescribed value in step ST9, steps ST1 to ST9 are repeated regardless of whether the operator changes the installation angle.

If the operator changes the installation angle and the error is changed, the displayed error is updated.

The operator continues the change of the installation angle while observing the error which is updated.

Incidentally, when the error becomes smaller than the prescribed value, information to that effect may also be displayed.

If such is done, the operator can recognize that the adjustment has been completed.

As was explained above, either one of the adjustment of the pan angle and the adjustment of the tilt angle may be performed before the other. The following factor may be considered in deciding the order of the adjustment of the pan angle and the adjustment of the tilt angle.

For adjusting the tilt angle in the manner described above, the marker needs to be formed on the floor surface even when the camera is inclined. If there is a wall surface, an interfering object, or the like in a relatively close position in the direction of the desired pan angle, when the camera's tilt angle were changed in the state in which the projector is positioned toward the desired pan angle direction with respect to the camera (that is, in the state in which the adjustment of the pan angle has been completed), the marker might be formed, not on the floor surface, but on the wall surface, or on a surface of the interfering object. In such a case, the tilt angle may be adjusted in a state in which the projector is positioned, with respect to the camera, toward a direction which is different from the desired pan angle, and in which the distance to the wall surface, the interfering object or the like is relatively long, and the adjustment of the pan angle (the rotation to the desired direction) is thereafter performed.

By adopting such a procedure, the adjustment of the tilt angle can be performed even when the floor surface which is available in the desired pan angle direction is relatively narrow.

In the above-described example shown in FIG. 7, it is assumed that the principal point of the lens and the rotation center of the camera coincide with each other. However, even if they do not coincide, the tilt angle can be calculated by a similar process.

Figure 9:
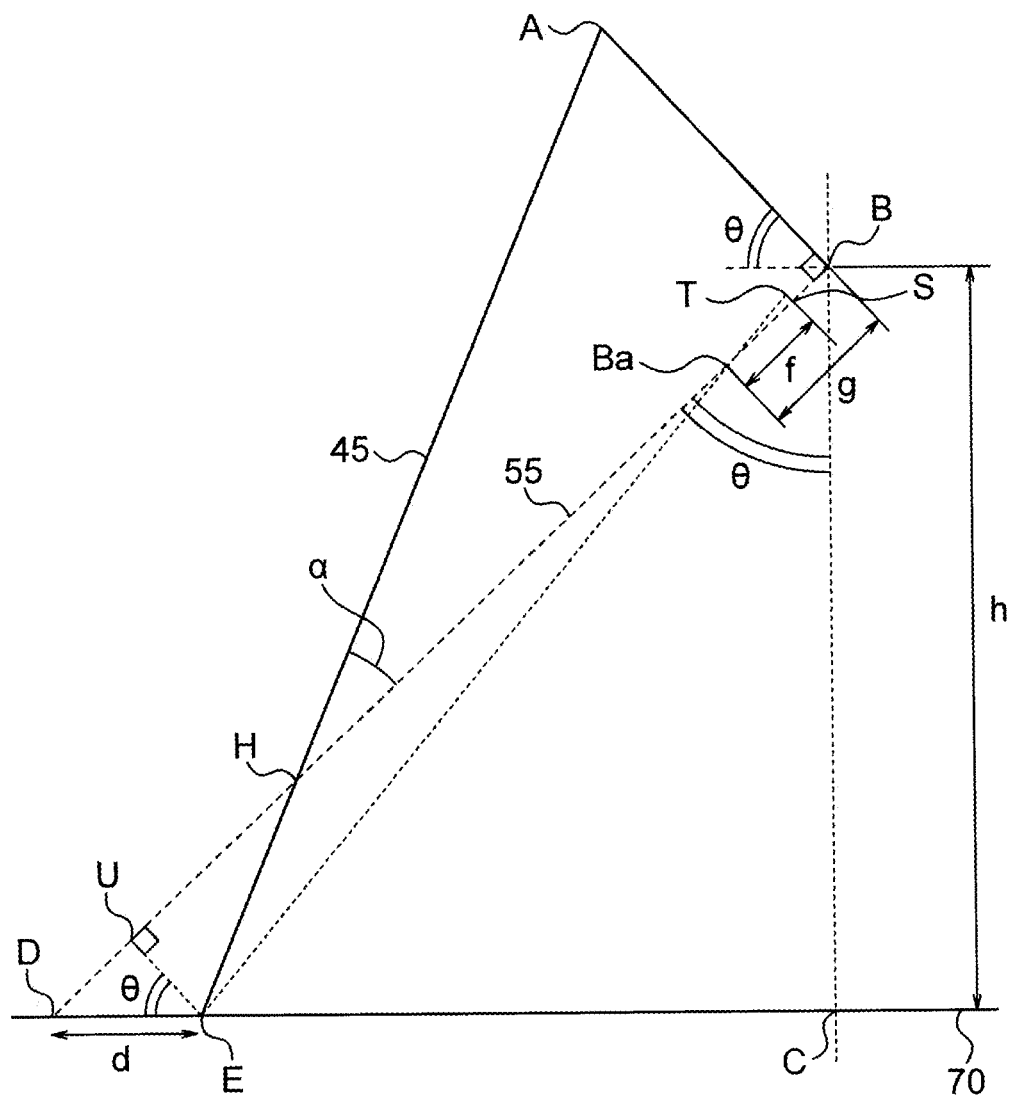
FIG. 9 is a view showing the deviation of the position of the marker from the intersection of the optical axis of the camera with the floor surface in a case in which the position of the principal point of the lens is different from the rotation center of the camera.

For example, if the principal point of the lens is at a point Ba in front of the rotation center B by a distance g, as shown in FIG. 9, the following equation (16) may be used in place of the equation (10a).

[Mathematical Expression 16]

$$BaU = \frac{h}{\cos\theta} - g - d \cdot \sin\theta \qquad (16)$$

In such a case, the equation (9) may be replaced by:

[Mathematical Expression 17]

$$BaU:BaS=UE:ST \qquad (17)$$

Moreover, corresponding changes may be made to the equation (11) and the equations subsequent to the equation (11).

In the example described above, it is assumed that the center (24) of the relative rotation of the projector and the rotation center B of the camera are aligned on a line perpendicular to the camera's optical axis 55. However, even if they are not aligned, the tilt angle can be calculated by a similar process.

Figure 10:
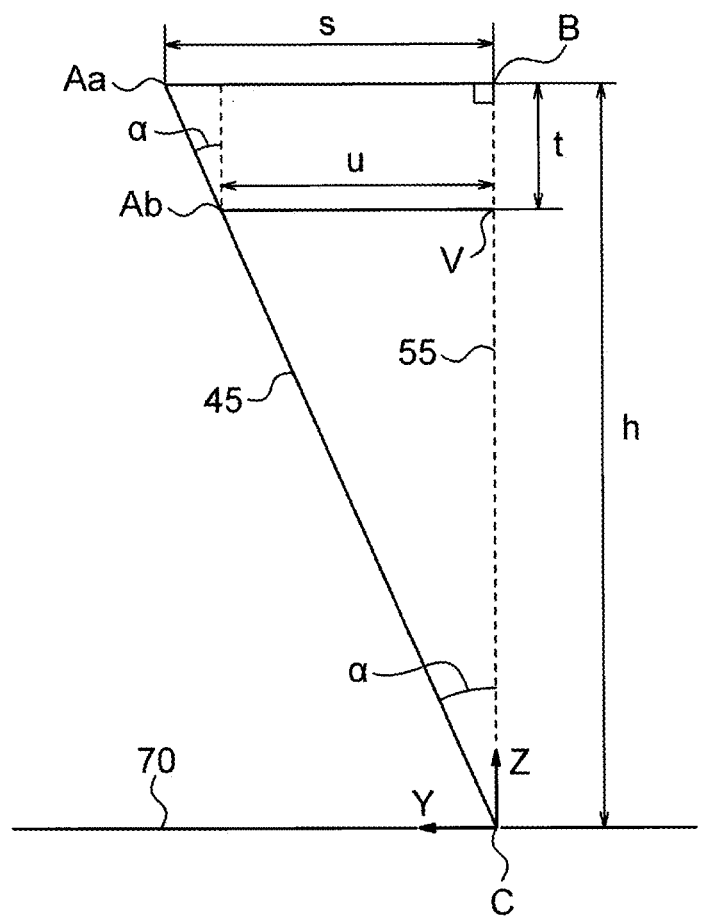
FIG. 10 is a view showing a state in which the relative angle has been so adjusted that the marker is formed at the intersection of the optical axis of the camera with the floor surface when the optical axis of the camera is normal to the floor surface in a case in which the center of the relative rotation of the projector is different from the example in FIG. 5.

For example, let us assume a situation in which the center (24) of the relative rotation of the projector is at a position (a position within the YZ plane) Ab shown in FIG. 10. The position Ab is on a line passing through a point V and perpendicular to the optical axis 55, and is separated by a distance u from the point V. Here, the point V is on the camera's optical axis 55, and is in front of the camera's rotation center B by a distance t.

In this case, s may be calculated by:

[Mathematical Expression 18]

$$s=u+t\cdot\tan\alpha \qquad (18)$$

and, in place of the equation (8),

[Mathematical Expression 19]

$$h = \frac{u}{\tan\alpha} + t \qquad (19)$$

may be used for calculating h, and s and h calculated in these manners may be used for the calculation of the equation (15) and the like.

In the equations (18) and (19), the distances t and u are values dependent on the structure of the camera 50 and the installation assistance device 10, and are known.

The reference characters Aa in FIG. 10 denote (rather than the center of the relative rotation of the projector 40) the intersection of a line passing through the camera's rotation center B, and perpendicular to the camera's optical axis 55, with the projector's optical axis 45, and s denotes the distance between the above-mentioned intersection Aa and the camera's rotation center B. The intersection Aa and the distance s vary with the variation of the relative angle α.

In the above-described example, it is assumed that the camera 50 is mounted to the ceiling 60 inside of a building, and a marker is formed on the floor surface 70. However, the arrangement may be such that a marker is formed on a wall surface, rather than a floor surface. Also, the camera may be installed outdoors. In such a case, the floor surface in the above description may be replaced with a road surface, a ground surface, an outer wall surface of a building, or the like, and the ceiling in the above description may be replaced with an outdoor structure (a post, an outer wall of a building) or the like.

Second Embodiment

The installation assistance device according to the above-described first embodiment is used for calculating the installation angle in the vertical direction (the tilt angle) using a floor surface, and performing adjustment to make the calculated tilt angle equal to a target value.

The installation assistance device according to the second embodiment is for calculating the installation angle in the horizontal direction (the pan angle) of a monitoring camera using a wall surface, and performing adjustment to make the calculated pan angle equal to a target value.

The installation assistance device according to the second embodiment has a configuration similar to that of the installation assistance device described in connection with the first embodiment with reference to FIGS. 1(a) and 1(b), and FIG. 4. However, the calculation in the installation angle calculating unit 108 is different.

The camera 50 is fixed to the ceiling 60 in a manner similar to that shown in FIGS. 2(a) and 2(b). However, unlike the first embodiment, the camera 50 is mounted so as to shoot a wall surface 80, as shown in FIGS. 11(a) and 11(b), and FIG. 12.

Figure 12:
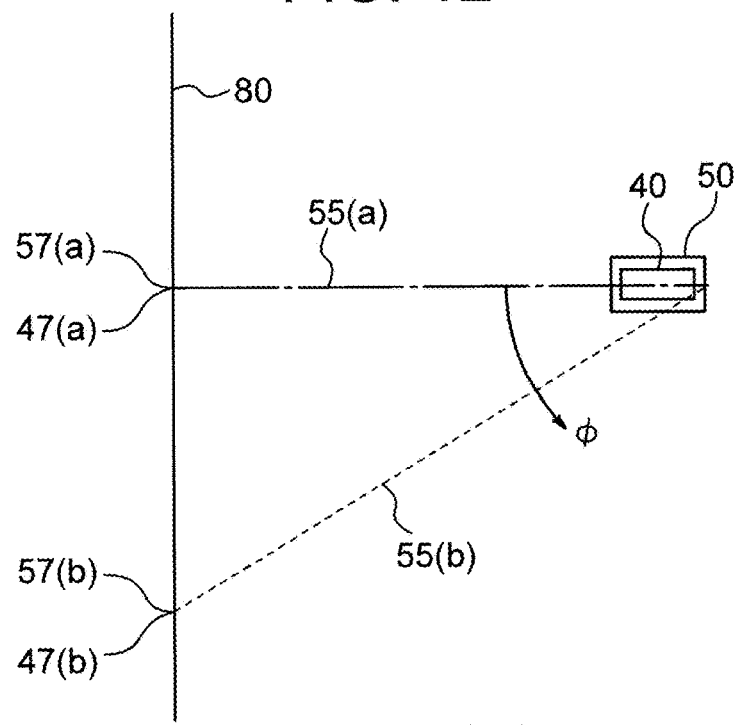
FIG. 12 is a view, as seen from the above, of the optical axis of the camera and the optical axis of the projector in the second embodiment.

FIGS. 11(a) and 11(b) are views of the camera 50 and the installation assistance device 10 directed toward the wall surface 80, as seen from the side, while FIG. 12 is a view of the camera 50 and the installation assistance device 10, as seen from above.

As in the first embodiment, the projector's optical axis 45 is in the same vertical plane as the camera's optical axis 55, and is inclined with respect to the camera's optical axis 55 by an angle α.

FIG. 11(a) shows a case in which the vertical plane including the camera's optical axis 55 and the projector's optical axis 45 is normal to the wall surface 80, whereas FIG. 11(b) shows a case in which the above-mentioned vertical plane is inclined with respect to the wall surface 80.

In FIG. 11(a), the optical axes 55 and 45 are denoted by reference characters 55(a) and 45(a), respectively, and the intersections of the optical axes 55 and 45 with the wall surface 80 are denoted by 57 (a) and 47(a). In FIG. 11(b), the optical axes 55 and 45 are denoted by 55(b) and 45(b), respectively, and the intersections of the optical axes 55 and 45 with the wall surface 80 are denoted by 57(b) and 47(b).

The chain line 55(a) in FIG. 12 indicates the camera's optical axis in the state of FIG. 11(a), and the dotted line 55(b) in FIG. 12 indicates the camera's optical axis in the state of FIG. 11(b). In FIG. 12, the projector's optical axes 45(a) and 45(b) coincide with the camera's optical axes 55(a) and 55(b).

The distance from the camera 50 to the wall surface 80 (the distance from the camera 50 to the intersection 57 (57(a), 57(b))) along the optical axis 55 and the distance from the projector 40 to the wall surface 80 (the distance from the projector 40 to the intersection 47 (47(a), 47(b))) along the optical axis 45 are longer in the state of FIG. 11(b) than in the state of FIG. 11(a).

Therefore, the distance (the distance in the vertical direction) between the intersection 57 (57(a), 57(b)) of the camera's optical axis 55 with the wall surface 80, and the intersection (the position where the marker is formed) 47 (47(a), 47(b)) of the projector's optical axis 45 with the wall surface 80 is longer in the case of FIG. 11(b) than in the case of FIG. 11(a).

Thus, the distance between the intersection 57 of the camera's optical axis 55 with the wall surface 80, and the intersection 47 of the projector's optical axis 45 with the wall surface 80 varies depending on the pan angle φ.

The distance between the intersection OA and the marker MK in the captured image will be of a value corresponding to the distance between the intersection 57 and the intersection 47.

Figure 13A:
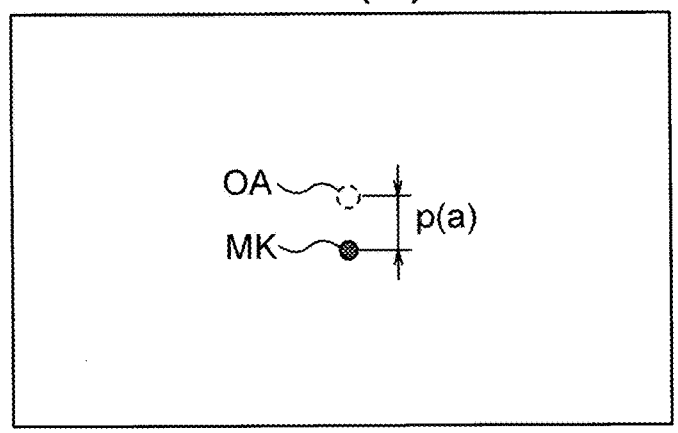
FIGS. 13(a) and 13(b) are views showing the position of the marker in the captured image.
Figure 13B:
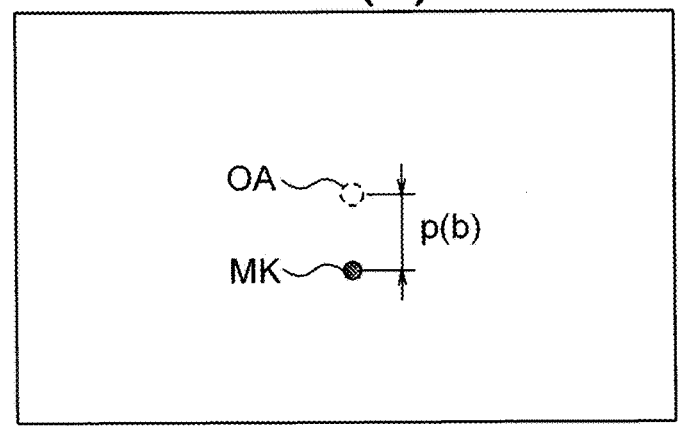

For example, the captured image in the state of FIG. 11(a) will be as shown in FIG. 13(a), the captured image in the state of FIG. 11(b) will be as shown in FIG. 13(b), and the distance p(b) between the intersection OA and the marker MK in FIG. 13(b) is longer than the distance p(a) between the intersection OA and the marker MK in FIG. 13(a).

As has been explained above, the distance p between the intersection OA and the marker MK in the captured image is related to the pan angle φ.

For example, if the pan angle φ in the state of FIG. 11(a) is defined as zero, the distance p between the intersection OA and the marker MK in the captured image is increased with increase of the absolute value of the pan angle φ.

By utilizing such a relation, a mathematical equation representing the relation between the pan angle φ and the distance p between the intersection OA and the marker MK in the captured image can be derived, in a manner similar to that explained in the first embodiment, and the derived mathematical equation can be used to calculate the pan angle φ from the distance p between the intersection OA of the camera's optical axis 55 with the wall surface 80, and the marker MK in the captured image.

Description has been made on cases where the marker is formed on the floor surface or the wall surface. However, the surface on which the marker is formed may be other than the floor surface and the wall surface, but may be any arbitrary surface.

Description has been made on cases where the tilt angle or the pan angle is adjusted to a target value. However, the angle to be adjusted is not limited to the tilt angle or the pan angle, but may be any installation angle.

Part or the entirety of the controlling unit of the above described installation assistance device may be formed of processing circuitry.

The processing circuitry may be configured of hardware or software, i.e., a programmed computer.

Figure 14:
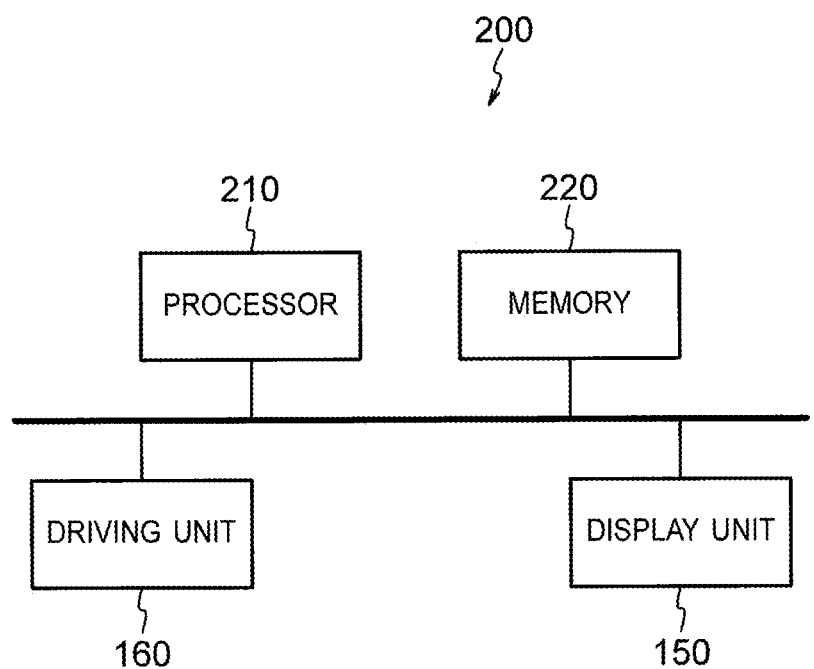
FIG. 14 is a diagram showing an example of a configuration of a computer constituting a controlling unit of the installation assistance device.

A configuration of the processing circuitry when the controlling unit 100 is formed of a programmed computer is, for example, as shown in FIG. 14.

In the illustrated example, the processing circuitry 200 includes a processor 210 and a memory 220.

FIG. 14 also shows the display unit 150 and the driving unit 160 controlled by the processing circuitry 200.

The memory 220 stores a program for implementing the functions of the various parts of the controlling unit 100.

The memory 220 additionally has the functions of the storage unit 110 in the controlling unit 100 shown in FIG. 4.

The processor 210 is formed, for example, of a CPU (Central Processing Unit), a GPU (Graphics Processing Unit), a microprocessor, a microcontroller, a DSP (Digital Signal Processor), or the like.

The memory 220 is formed, for example, of a semiconductor memory, such as a RAM (Random Access Memory), a ROM (Read Only Memory), a flash memory, an EPROM (Erasable Programmable Read Only Memory), an EEPROM (Electrically Erasable Programmable Read Only Memory), or the like, or a magnetic disc, an optical disc, a magneto-optical disc, or the like.

The processor 210 realizes the functions of the controlling unit 100 by reading and executing the program stored in the memory 220.

The functions of the controlling unit 100 include control over display by the display unit 150, and control over driving by the driving unit 160, as mentioned above.

The installation assistance device according to the present invention has been described. An installation assistance method and an installation angle calculation method implemented by the above-described installation assistance device also form part of the present invention. A program for causing a computer to execute the processes in the installation assistance device, the installation assistance method, or the installation angle calculation method having been described, and a recording medium in which the above-mentioned program is stored also form part of the present invention.

The present invention is not limited to the configurations described in the first and second embodiments, but various modifications can be made, and yet they are within the scope of the present invention.

As has been described, according to the present invention, the installation angle can be calculated using an arbitrary surface, so that the installation angle of the camera can be adjusted to be equal to a target value regardless of the environment of the area to be monitored. Moreover, if the error of the actual value of the installation angle with respect to the target value is displayed, the operator can decide on the direction and the amount of change by observing the displayed error, and, therefore, the work of the adjustment of the installation angle is made easier.

REFERENCE CHARACTERS

10: installation assistance device; 40: projector; 50: camera; 70: floor surface; 102: interface unit; 104: recognizing unit; 106: relative angle adjusting unit; 108: installation angle calculating unit; 110: storage unit; 112: error calculating unit; 150: display unit; 160: driving unit.

The invention claimed is:

1. A camera installation assistance device comprising:
a projector mountable to a camera, and to emit light toward a surface to form a marker on said surface; and
processing circuitry to adjust a relative angle of said projector with respect to said camera such that, when said optical axis of said camera is normal to said surface, said marker is formed at an intersection of said optical axis with said surface,
to recognize, from an image obtained by shooting said marker by means of said camera, the marker in said image,
to calculate an installation angle of said camera based on a distance between said marker and an intersection of an optical axis of said camera with said surface, in said image,
to store a target value of the installation angle of said camera, and
to calculate an error by comparing the calculated installation angle with the stored target value of the installation angle.

2. The camera installation assistance device as set forth in claim 1, further comprising:
a display to display the calculated error.

3. The camera installation assistance device as set forth in claim 1, wherein
said processing circuitry adjusts said relative angle such that, in the image obtained by shooting when said optical axis of said camera is normal to said surface, a position of the marker coincides with a position of the intersection of said optical axis with said surface.

4. The camera installation assistance device as set forth in claim 3, further comprising:
a driver to cause said projector to rotate thereby to change said relative angle, wherein
said processing circuitry calculates an adjusted value of said relative angle based on an angle by which said projector has rotated being driven by said driver, and said processing circuitry also uses the calculated adjusted value of said relative angle, for the calculation of said installation angle of said camera.

5. The camera installation assistance device as set forth in claim 4, wherein
said processing circuitry calculates the installation angle of said camera based on a distance between said marker and the intersection of said optical axis with said surface in the image obtained by shooting said marker, when said relative angle is at said adjusted value, and said optical axis of said camera is in a direction other than the direction normal to said surface.

6. The camera installation assistance device as set forth in claim 1, wherein
said surface is a floor surface, and said installation angle is a tilt angle.

7. The camera installation assistance device as set forth in claim 1, wherein
said surface is a wall surface, and said installation angle is a pan angle.

8. An installation angle calculation method comprising:
emitting light from a projector toward a surface to form a marker on said surface;
shooting the marker formed on said surface by means of a camera; and
adjusting a relative angle of said projector with respect to said camera such that, when an optical axis of said camera is normal to said surface, said marker is formed at an intersection of said optical axis with said surface;
calculating an installation angle of said camera based on a distance between said marker and the intersection of said optical axis of said camera with said surface in an image obtained by shooting said marker when said relative angle is at an adjusted value, and said optical axis is in a direction other than the direction normal to said surface.

9. A camera installation assistance method comprising:
calculating and displaying an error of the installation angle calculated by the installation angle calculation method as set forth in claim 8, with respect to a target value of the installation angle.

10. A non-transitory computer-readable recording medium in which a program for causing a computer to execute processes in the installation angle calculation method as set forth in claim 8 is recorded.

11. A non-transitory computer-readable recording medium in which a program for causing a computer to execute processes in the camera installation assistance method as set forth in claim 9 is recorded.

* * * * *